(12) United States Patent
Arlton

(10) Patent No.: US 6,929,215 B2
(45) Date of Patent: Aug. 16, 2005

(54) ROTOR SYSTEM FOR HELICOPTERS

(76) Inventor: Paul E. Arlton, 3279 Secretariat Cir., West Lafayette, IN (US) 47906

(*) Notice: Subject to any disclaimer, the term of this patent is extended or adjusted under 35 U.S.C. 154(b) by 0 days.

(21) Appl. No.: 10/488,317
(22) PCT Filed: Sep. 4, 2002
(86) PCT No.: PCT/US02/28033
§ 371 (c)(1), (2), (4) Date: Mar. 1, 2004
(87) PCT Pub. No.: WO03/020583
PCT Pub. Date: Mar. 13, 2003

(65) Prior Publication Data
US 2004/0217229 A1 Nov. 4, 2004

Related U.S. Application Data
(60) Provisional application No. 60/317,003, filed on Sep. 4, 2001.

(51) Int. Cl.$^7$ ................................................ B64C 1/14
(52) U.S. Cl. .............................. 244/17.11; 244/17.19; 446/37
(58) Field of Search ........................... 244/17.19, 60, 244/17.11; 416/169 R, 32; 446/37; 403/362, 361, 300, 308, 281, 278

(56) References Cited

U.S. PATENT DOCUMENTS

| | | | |
|---|---|---|---|
| 2,542,682 A | | 2/1951 | Kloss |
| 3,589,833 A | | 6/1971 | Lancioni |
| 5,360,376 A | | 11/1994 | Baldino |
| 5,609,312 A | * | 3/1997 | Arlton et al. ............ 244/17.11 |
| 5,749,540 A | * | 5/1998 | Arlton .................... 244/17.13 |
| 5,836,545 A | * | 11/1998 | Arlton et al. ................. 244/60 |

* cited by examiner

Primary Examiner—Peter M. Poon
Assistant Examiner—Timothy D Collins
(74) Attorney, Agent, or Firm—Barnes & Thornburg LLP

(57) ABSTRACT

A tail rotor system for a helicopter includes a gear box housing retainer (66) coupled to the tail boom (16) of the helicopter. The tail rotor system also includes a power-limiting device (50) configured to disconnect the tail rotor from a power plant for driving the tail rotor about a rotor axis of rotation.

12 Claims, 19 Drawing Sheets

ROTOR SYSTEM FOR HELICOPTERS

This application claims the benefit of Provisional Application No. 60/317,003, filed Sep. 4, 2001.

BACKGROUND AND SUMMARY

The present disclosure relates to rotor systems for helicopters and similar aircraft, and in particular to tail rotors.

Helicopters are flying machines which can fly in any direction or hove over a point on the ground without moving. Helicopters usually have a single main rotor mounted on top of a body or fuselage of the helicopter to generate a lift force to hold the helicopter in the air, and a tail rotor or other yaw control system to maintain directional control of the helicopter. Several different yaw control systems have been developed (such as blown tail booms and shrouded fans), but traditional tail rotor systems with exposed tail rotor blades are still the most popular.

With all of their rotating rotor blades, gears, and mechanical linkages helicopters are typically more complicated and expensive than other types of aircraft such as fixed-wing airplanes. Helicopters are also generally more difficult to fly than airplanes, and model helicopters are particularly difficult to control. As a result, pilot of model helicopters frequently crash and damage their models. Model helicopters can be very expensive to repair, so relatively few modelers have the patience, skill, and budget to master them. Components that reduce the complexity and cost of helicopters make helicopters more available to the general public, easier to maintain and repair, and generally more competitive with other types of aircraft.

Tail rotor systems on helicopters are extremely important because the control the direction of flight. Tail rotors are also more likely to be damaged than other parts of a helicopter because they are often operated near obstruction such as trees or the ground, and are lightly constructed to prevent a tail-heavy condition of the helicopter which would adversely affect the helicopter in flight. Impact of the tail rotor blades on an obstruction can cause the helicopter to loose control and crash. Tail rotor failure and tail blade strikes, on obstructions are one of the most common types of helicopter accidents which lead to personal injures of the pilot and bystanders and loss of the helicopter. What is needed is a tail rotor system that is simple, inexpensive and less susceptible to damage.

According to the present disclosure, a helicopter tail rotor system comprises a tail boom, a gear box associated with the tail boom, and tail rotor blades mounted for rotation relative to the gear box. The tail rotor system further comprises a retainer configured to move in a retainer aperture provided in the gear box to engage and deform the tail boom to retain the gear box in a mounted position on the tail boom. Thus, a method is disclosed herein for moving a retainer relative to a gear box to deform the tail boom to secure the gear box in a fixed position on the tail boom.

In illustrative embodiments, the gear box includes a gear box housing formed to include the retainer aperture and a rotatable bevel gear mounted for rotation in the gear box housing and coupled to rotate with a rotatable drive shaft extending through the tail boom. The tail rotor blades are adapted to rotate in response to rotation of the drive shaft and the bevel gear coupled to the drive shaft. The retainer is used to retain the gear box housing in a fixed position on the tail boom without hindering rotation of the drive shaft in the tail boom or the bevel gear in the gear box housing.

Additional features of the disclosure will become apparent to one skilled in the art upon consideration of the following description of the various embodiments which illustrate the best mode for carrying out the disclosure as presently perceived.

BRIEF DESCRIPTION OF THE DRAWINGS

The following detailed description refers particularly to the accompanying figures which are drawn to scale in which.

DETAILED DESCRIPTION

Figure 1:
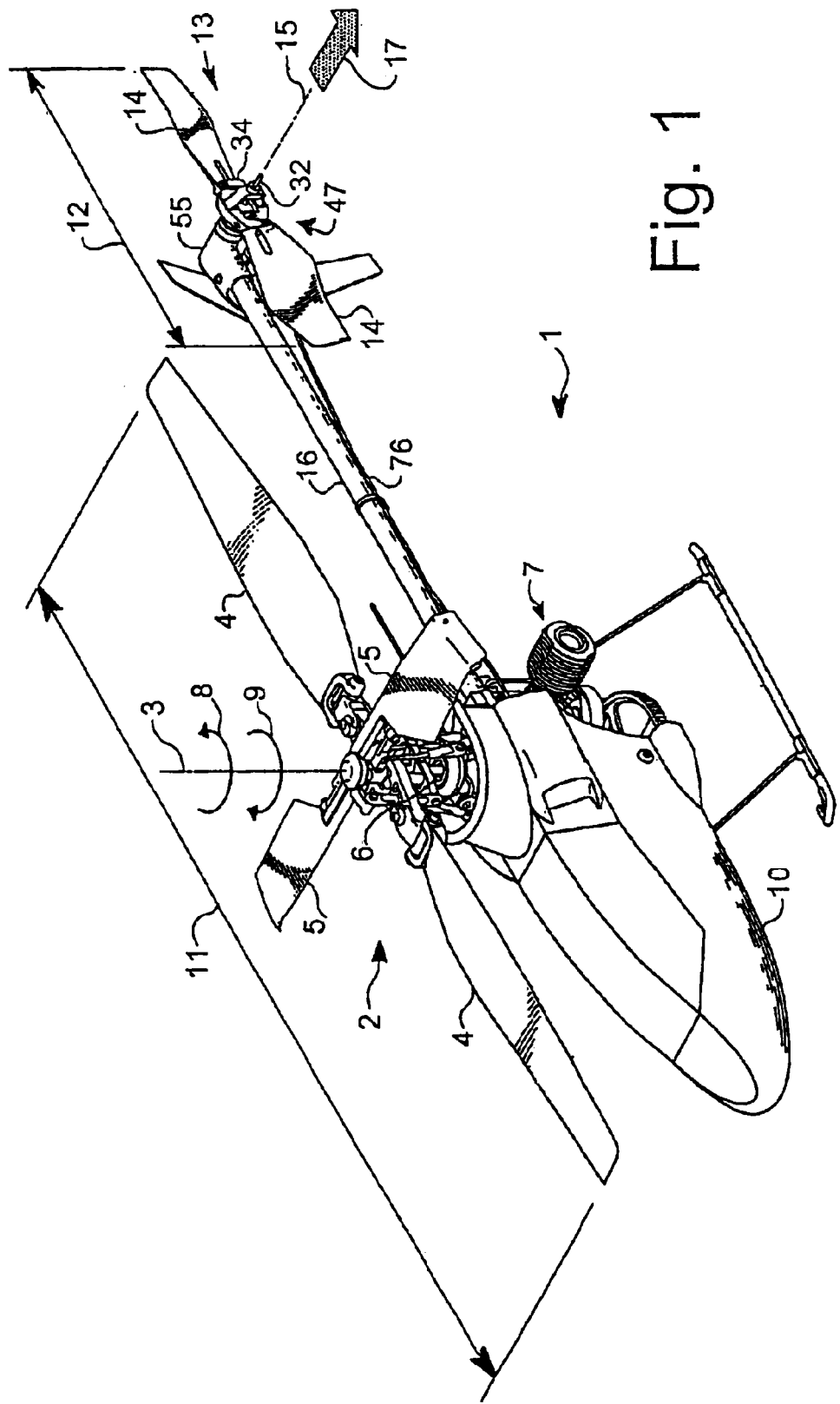
FIG. 1 is a perspective view of a representative helicopter including an improved tail rotor system in accordance with the present disclosure.

Referring to FIG. 1, a helicopter 1 is designed to include a large main rotor 2 which rotates about a main rotor axis of rotation 3 to lift helicopter 1 into the air. Helicopter 1 also includes a smaller tail rotor 13 which rotates about a tail rotor axis of rotation 15 to counteract the torque produced by main rotor 2 and steer helicopter 1. Tail rotor 13 is mounted at the end of a tail boom 16.

Both main rotor 2 and tail rotor 13 of helicopter 1 are driven by a power plant 7 such as engine or an electric motor (not shown) usually located within the fuselage (body) of helicopter 1 near main rotor shaft 6 (mostly hidden) although tail rotor 13 could also be operated by, for instance, a separate motor or engine (not shown) mounted at the end of tail boom 16. A streamlined fuselage shell 10 covers the front of helicopter 1, but does not extend back to tail rotor 13. In alternative embodiments, the fuselage shell may extend back to tail rotor 13 and enclose the tail boom 16. FIG. 1 is drawn to scale. Main rotor span 11 is 24" (twenty-four inches) and tail rotor span 12 is 8" (eight inches) in the case of a flying model helicopter.

Although helicopter 1, shown in FIG. 1, is a model helicopter, man-carrying helicopters (not shown) also have main rotors and tail rotors, and that other types of rotary wing aircraft (such as tilt-rotor aircraft) use thrust-producing appendages. Such full-sized helicopters can operate in a similar fashion and benefit in similar ways from the current disclosure.

Figure 14:
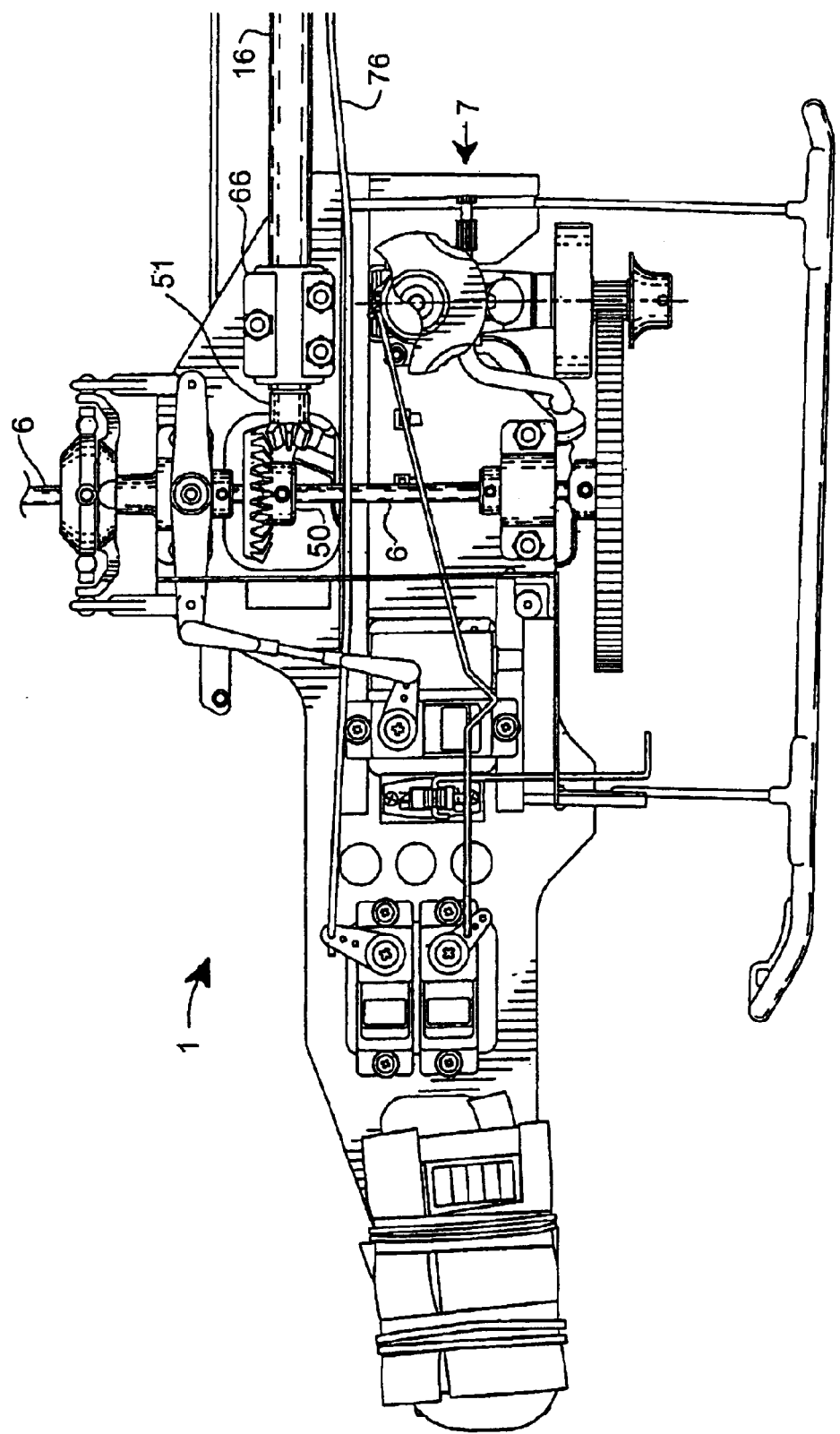
FIG. 14 is a side elevation view of the helicopter shown in FIG. 1 with the body cover (canopy) removed to show interior detail including, for instance, radio-control system components and tail rotor drive train components.

Illustratively, main rotor 2 of helicopter 1 includes two main rotor blades 4 and two shorter stabilizer blades 5 supported by a main rotor shaft 6 (see FIG. 14) aligned with main rotor axis of rotation 3. In operation, main rotor 2 rotates rapidly about main rotor axis of rotation 3 in rotation direction 8. As main rotor 2 rotates, main rotor blades 4 and subrotor blades 5 act like propellers or fans moving large amounts of air downward thereby creating an aerodynamic force that lifts helicopter 1 upward. This force can be directed straight down or in various directions by main rotor 2 to make the helicopter 1 fly forwards, backwards or sideways. When a helicopter moves forwards, backwards or sideways it is said to be "translating" and in a state of "translating flight." When a helicopter is flying nearly motionless in the air over a spot on the ground it is said to be "hovering" over the spot.

Angular motions of helicopter 1 about main rotor axis 3 are called "yaw motions," and forces that tend to rotate helicopter 1 about main rotor axis 3 are called "yaw moments" or "yaw torques." The yaw torque (reaction force) created by rotating main rotor 1 in rotation direction 8 tends to cause helicopter 1 to swing about main rotor axis of rotation 3 in yaw direction 9. When trimmed for steady hovering flight, tail rotor 13 propels air in direction 17 creating enough thrust force in direction 17 to cancel the yaw torque produced by main rotor 2 exactly so that helicopter 1 maintains a constant heading in flight.

Decreasing or increasing the thrust force of tail rotor 13, as by increasing or decreasing the collective pitch of tail rotor blades 14 or the speed of rotation of tail rotor 13, will cause helicopter 1 to turn in yaw directions 8 or 9 respectively. Typically, the pilot of a full-sized helicopter (not shown) controls the collective pitch of tail rotor blades 14 by manipulating foot pedals located within the cockpit (not shown). Cables, push-pull rods, mixing arms, and bellcranks connect the pedals to the pitch controls of tail rotor blades 14. As the pilot adjusts the pedal position, the change in angle-of-attack (pitch) and associated thrust force of the rotating tail rotor blades results in a yaw moment about the main rotor axis. This yaw moment is directed to maneuver the helicopter, or to oppose any destabilizing yaw moment sensed by the pilot.

Tail rotors of radio-controlled model helicopters are usually designed to operate in a manner identical to full-sized helicopters. The pilot manipulates small joysticks on a hand-held radio transmitter (not shown) which in turn sends commands to electromechanical servo actuators located within the flying model. Push-pull rods, mixing arms, and bellcranks connect the servos to the collective pitch controls of the tail rotor blades. Alternatively, tail rotors can be operated, for instance, by a motor (not shown) mounted at the end of a tail boom of the helicopter and connected to the tail rotor blades. Changes in the speed of the electric motor (not shown) change the speed and vary the thrust of the tail rotor.

Figure 2:
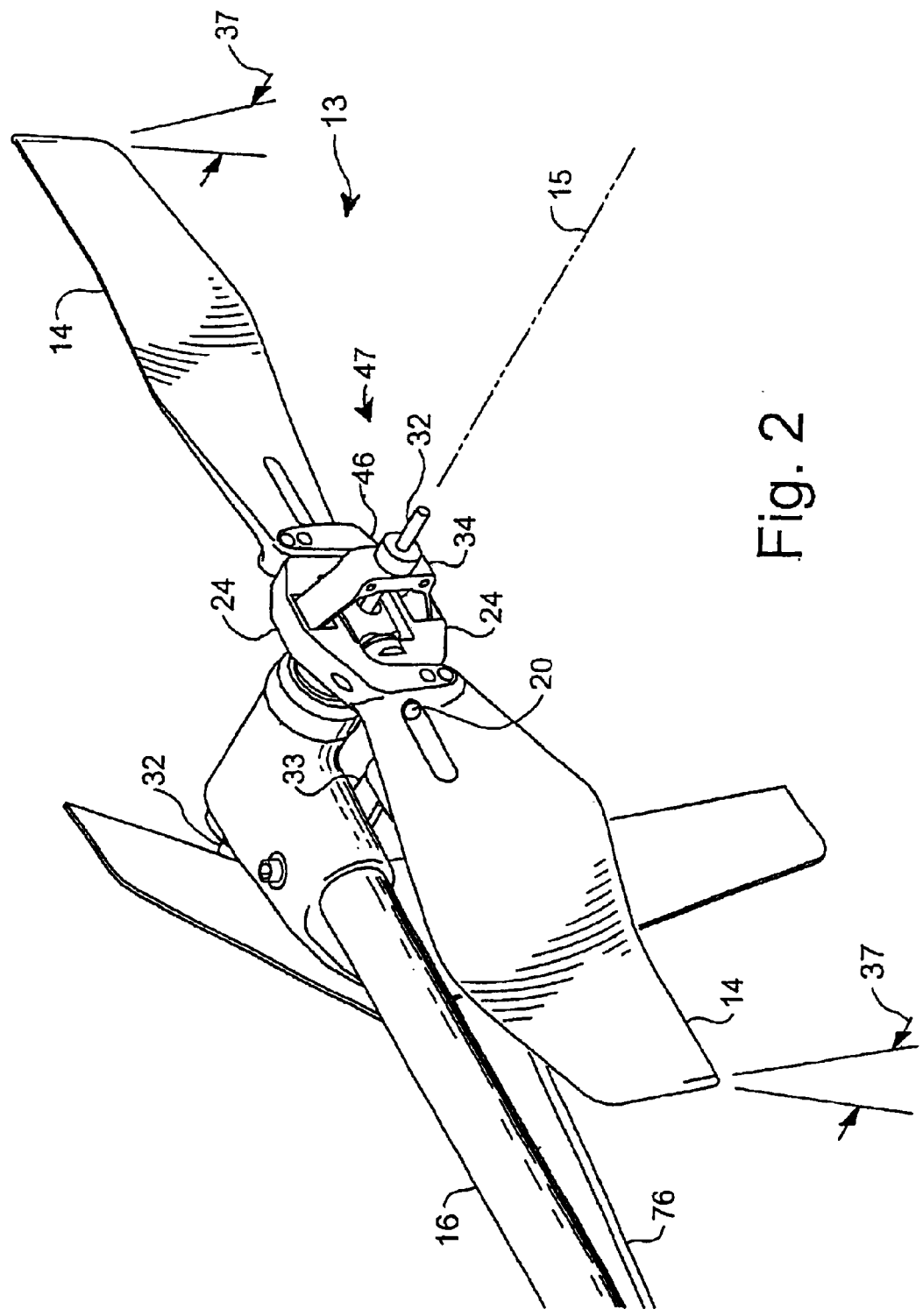
FIG. 2 is an isometric perspective view of a tail rotor assembly of the helicopter illustrated in FIG. 1 showing exterior details of the tail rotor assembly.

As shown in more detail in FIG. 2, which is an enlarged view of a tail assembly of helicopter 1 having a tail rotor system in accordance with the present disclosure, tail rotor blades 14 are fixedly secured to reach-around blade grips 24. Axial motion of push-pull rod 32 along axis 15 (as caused by operation of bellcrank 33) moves spider 34 along tail rotor axis 15 thereby varying collective pitch angle 37 of tail rotor blades 14 and the thrust of tail rotor 13.

Figure 3:
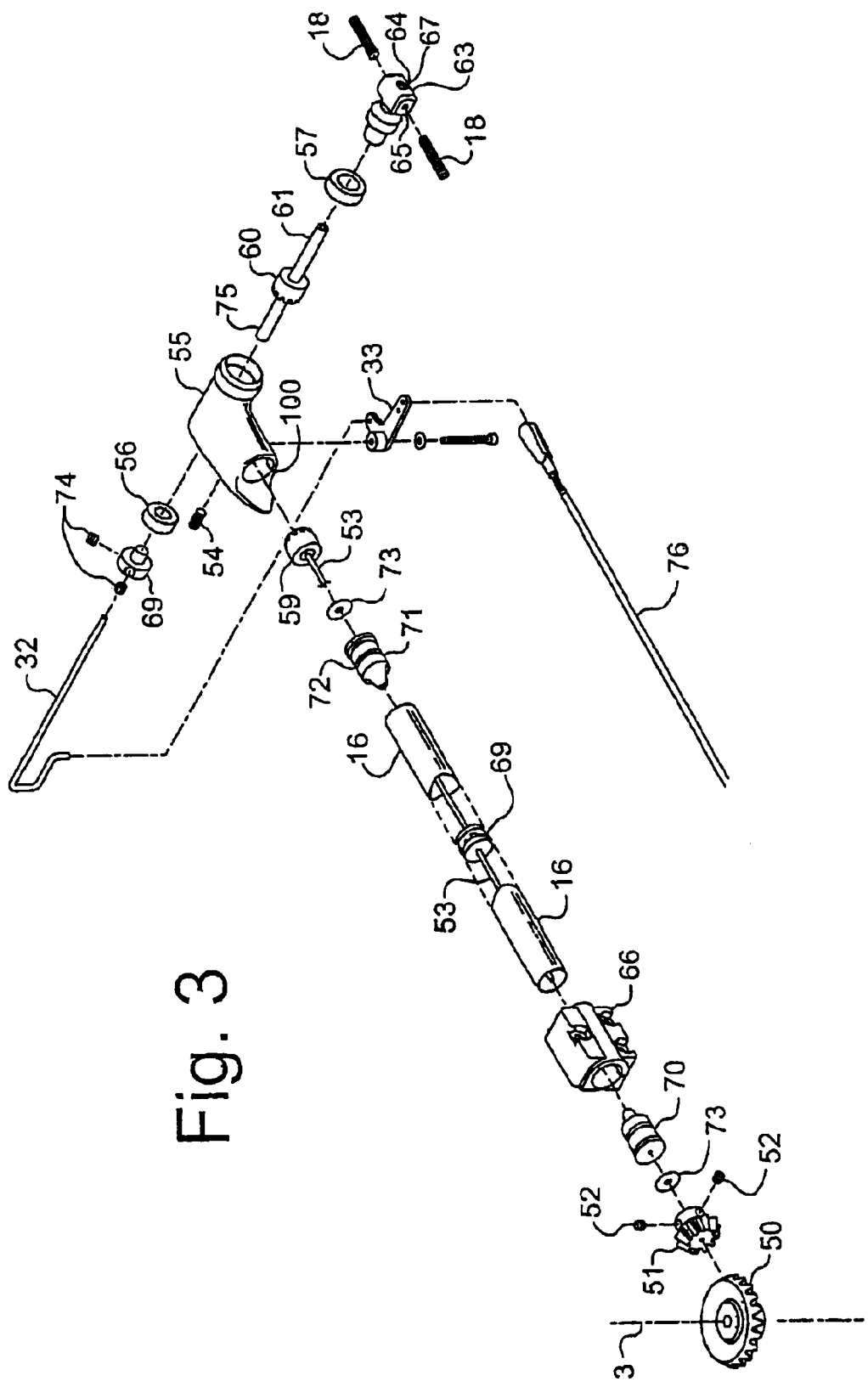
FIG. 3 is an exploded isometric perspective view of the tail boom and tail rotor gear box assembly of the helicopter illustrated in FIG. 1 showing tail rotor drive components situated within the tail boom and tail rotor gear box.

Now referring to FIG. 3, which is an exploded view of the tail boom assembly of helicopter 1, crown gear 50 is fixed to rotate with main rotor shaft 6 (not shown) about main rotor axis 3 and drives front pinion gear 51. Front pinion gear 51 is fixedly coupled to rotatable drive shaft 53 by gear retainer 52. Rotatable drive shaft 53 is located within tail boom 16 (shown in sections) and transmits power from crown gear 50 to tail rotor 13. Gear box housing 55 is mounted at the end of tail boom 16 and encloses ball bearings 56, 57, rotatable bevel gears 59, 60, and hollow tail rotor shaft 61 that together support and drive tail rotor 13 (shown in FIG. 1,2). Bearing collar 69 is fixedly secured to one end 75 of tail rotor shaft 61 by force receivers, or setscrews 74 and retains bearing 56 in gear box housing 55.

Rotational motion from power plant 7 of helicopter 1 is transmitted to tail rotor 13 through front crown gear 50, front pinion gear 51 (which is appended to rotatable drive shaft 53), rotatable bevel gears 59, 60, tail rotor shaft 61, and tail rotor hub 63. In the embodiment shown in the figures, tail rotor 13 is driven at a rotational speed of about 2 to 3 times that of main rotor 2. Pinion gear 51 and bushing 70, and rotatable bevel gear 59 and bushing 71 are separated by drive washers 73 which are made of a low-friction material such as Teflon.

Because tail rotor blades 14 are fixedly coupled to reach-around grips 24, and not coupled by a pivot mechanism as are the tail rotor blades on some helicopters (not shown), impact of tail rotor blades 14 on the ground or other obstruction (not shown) can induce damaging forces in the tail rotor drive train (which is also known as the tail rotor power transmission system). In one embodiment of the current disclosure, crown gear 50 contains a slip-clutch 82 (see, for example, FIG. 15) or other torque-limiting or power-limiting device to limit the torque or power transmitted through the tail rotor drive train to tail rotor blades 14. When, for instance, tail rotor blades 14 strike an obstruction, the slip-clutch 82 reduces the power available to tail rotor 13 by disconnecting the tail rotor drive train from power plant 7 thereby minimizing damage done by tail rotor blades 14 on the obstruction, and the damage done to tail rotor blades 14 by the obstruction.

For model helicopters configured according to the current disclosure, tail boom 16 (shown in sectioned cut-away) is made of a deformable material such as aluminum, has a center bushing 69 and end bushings 70,71 at each end made of a plastics material such as Delrin which take the place of expensive ball bearings. When installed, gear box housing retainer 54 extends into the interior of gear box housing 55 near the end of tail boom 16 and sets securely against the outer surface of tail boom 16. Bushing channel 72 is formed in end bushings 71 to accommodate deformation of tail boom 16 by the end of gear box housing retainer 54 which secures gear box housing 55 against rotation or axial motion relative to tail boom 16.

Figure 13:
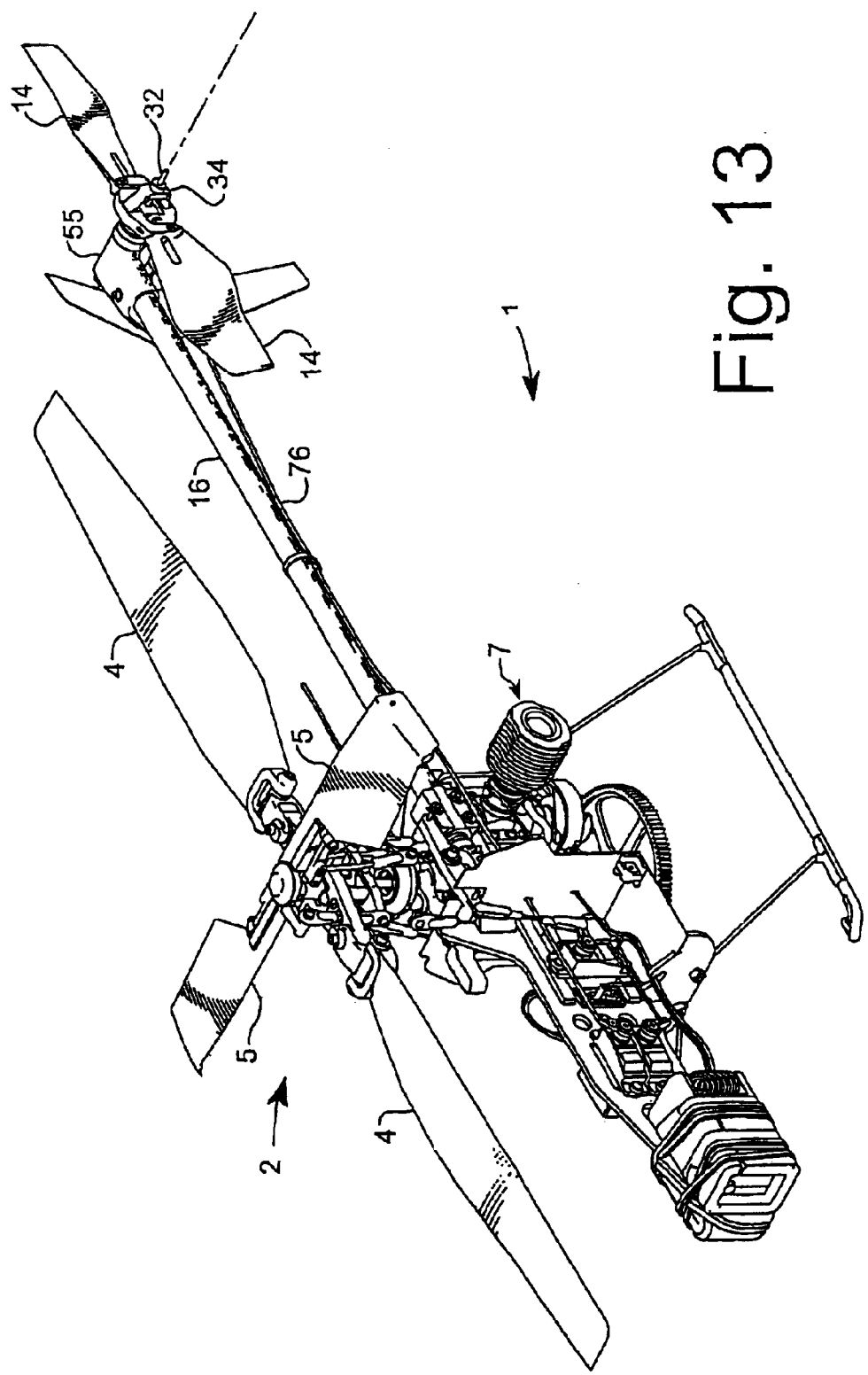
FIG. 13 is an isometric perspective view of the helicopter shown in FIG. 1 with the body cover (canopy) removed to show interior detail.

Tail boom bracket 66 is provided to mount tail boom 16 to the fuselage structure of helicopter 1 (as shown in FIG. 13). A gear box housing retainer 54 (not shown) is incorporated into tail boom bracket 66 to deform the wall of tail boom 16 adjacent to tail boom bracket 66 to prevent tail boom 16 from moving relative to tail boom bracket 66 (using the method herein disclosed to secure gear box housing 55 to tail boom 16).

Tail rotor pushrod 76 extends rearward from the pilot controls of helicopter 1 and is operably coupled to bellcrank 33. Bellcrank 33 is operably coupled to one end of push-pull rod 32 which extends transversely through the interior of gear box housing 55 and tail rotor hub 63 to exit tail rotor hub 63 through hole 64. Tail rotor axle screws 18 secure tail rotor hub 63 to hollow shaft 61.

Figure 4:
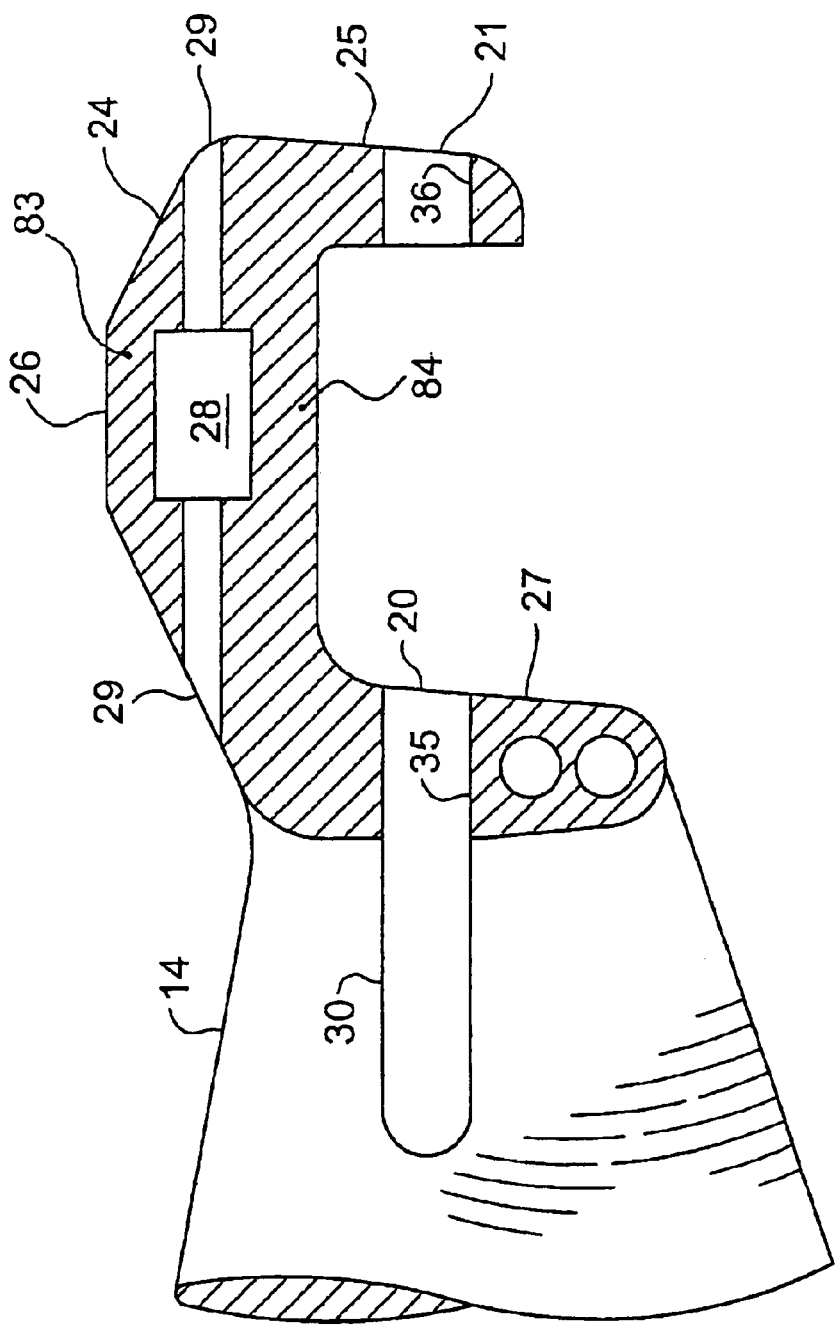
FIG. 4 is a partial view of a tail rotor blade illustrated in FIG. 2 showing the blade grip attachment area cut away to show interior detail.
Figure 5:
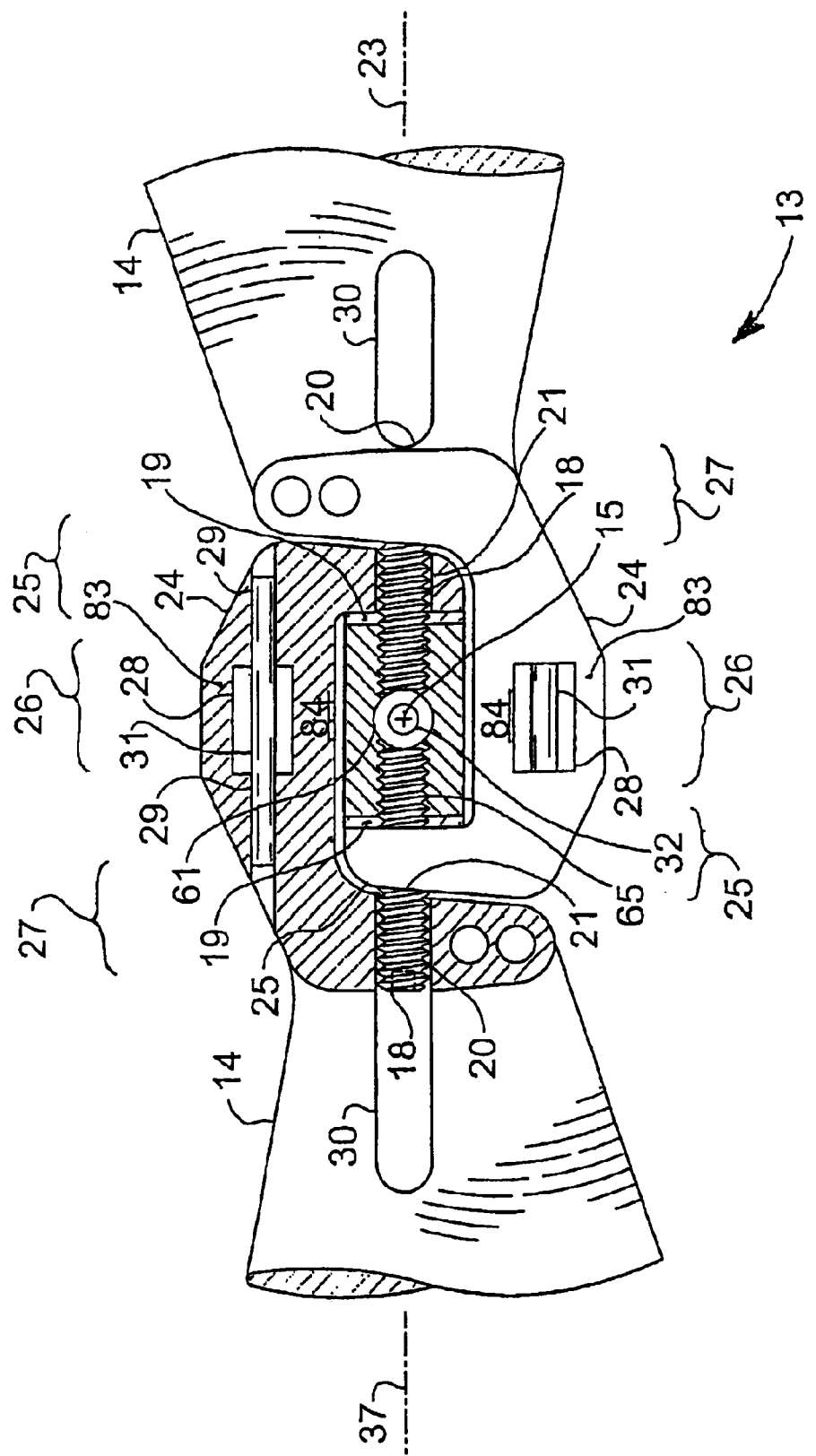
FIG. 5 is a partial view of the tail rotor blade assembly illustrated in FIG. 2 showing the blade grip attachment area cut away to show interior detail.

As shown in FIGS. 4 and 5, tail rotor 13 comprises two opposing tail rotor blades 14 pivotable about axle screws 18 and fixedly coupled to blade grips 24. FIGS. 4 and 5 are drawn to scale, and axle screws 18 are shown about ⅝ inches (0.625") long. Grip 24 comprises distal finger portion 25 located away from blade 14, base portion 27 located adjacent to blade 14, and intermediate link portion 26 located between finger portion 25 and base portion 27. Co-axial outer pivot holes 20 and inner pivot holes 21 extend through base portion 27 and finger portion 25 and are receptive to axle screws 18 for rotation about pitch axis 23. Tail rotor axle screws 18 extend through the smooth interiors 35,36 of outer pivot holes 20 and inner pivot holes 21, thread into holes 65 in tail rotor hub 63 (see FIG. 6) and engage hollow shaft 61 thereby securing tail rotor hub 63 to hollow shaft 61. Thrust washers 19 abut the inner faces of finger portion 25 and the exterior of hub 63, and are manufactured of a low-friction material such as Teflon.

Link portion 26 of grip 24 has link opening 28 extending completely through link portion 26 along axis 15 formed by outer cross-member 83 and inner cross-member 84. Spider pin 31 extends through the middle of opening 28 and into pin holes 29 in finger portion 25 and base portion 27 of blade grip 24. Axle screw recess 30 in blade 14 is slightly larger in diameter than axle screws 18 and facilitates insertion of axle screw 18 during assembly of tail rotor blade 14 to tail rotor hub 63. In one embodiment, tail rotor blade 13 is injection molded from a plastics material such as nylon or polycarbonate. Plastics materials such as nylon and polycarbonate have the strength and stiffness needed for proper operation of tail rotor blade 14 in flight. In addition, plastics materials such as nylon have an abrasion resistance property which enables these materials to act as bearing surfaces at 35,36 when in contact with the exterior of axle screws 18.

A feature of the current disclosure when molded from a plastics material is that pivot holes 20,21 are of a slightly larger diameter than axle screws 18, and extend completely through finger portion 25 and base portion 27 into blade 14 thereby forming axle screw recess 30. When molded in a plastics injection mold with a movable core pin (as would be understood by one skilled in the art of plastics molding), the core pin extends through blade grip 24 and into tail rotor blade 14 simultaneously forming not only axle screw pivot holes 20,21, but also screw recess 30 in blade 14 which is needed for proper insertion of axle screw 18 during assembly of tail rotor blade 13 to hub 63. Having a mold core pin along the mold parting line simplifies mold construction and operation.

Figure 6:
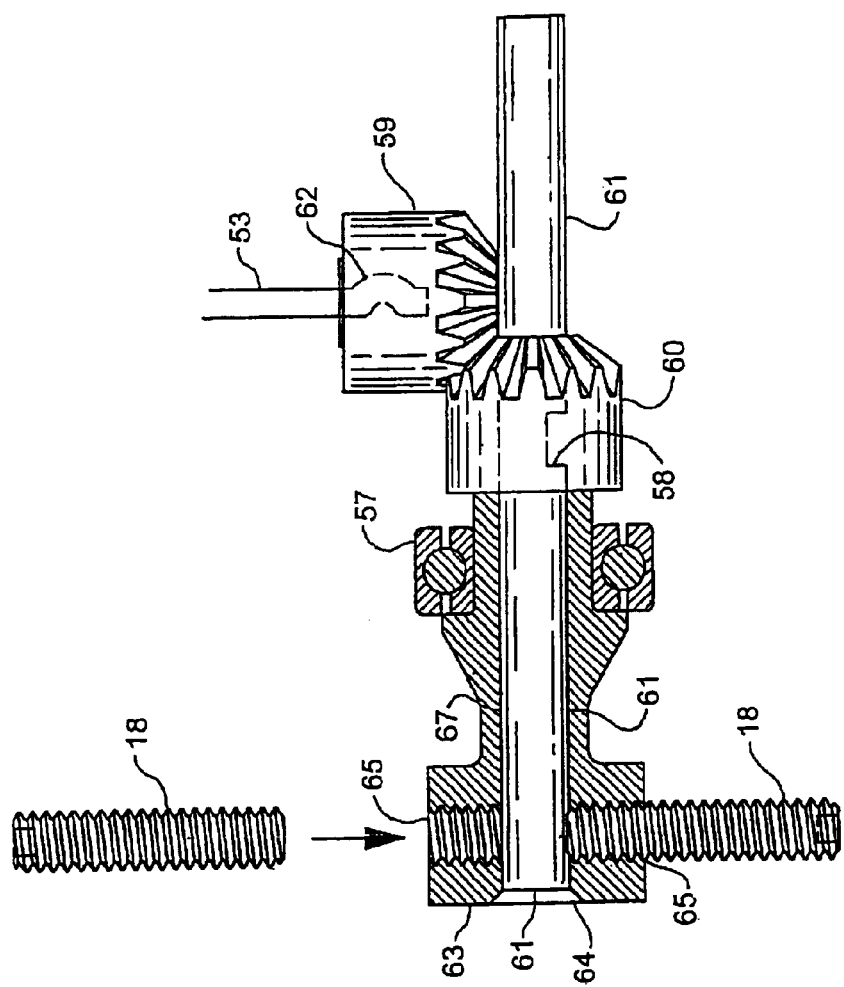
FIG. 6 is a top elevation view of the tail rotor hub assembly illustrated in FIG. 2, with the tail rotor hub and shaft bearing cut away to show interior detail, and with most tail rotor and tail boom components removed for clarity.

Referring now to FIG. 6, tail rotor hub 63 is generally hollow, has through hole 67 to accept tail rotor shaft 61, and has two threaded cross holes 65 receptive to axle screws 18. In one embodiment of the current disclosure, axle screws 18 act both as pivot axles for tail rotor blades 14 and as attachment screws to secure hub 63 to hollow shaft 61. While hub 61 can be manufactured from a metal material, in one embodiment of the current disclosure, hub 63 is injection molded from a plastics material such as Delrin or Acetyl as would be understood by one skilled in the art of plastics manufacturing. Plastics materials such as Delrin or Acetyl have the combined physical properties of strength and toughness to withstand the severe operating conditions of tail rotor hub 63, but also have thread locking properties to prevent axle screws 18 from loosening in flight and being ejected radially from spinning tail rotor 13. In addition, the complex geometry of tail rotor hub 63 is well suited for manufacture by multi-cavity injection molding techniques wherein a molten plastics material is forced into several mold cavities simultaneously in order to make many parts simultaneously.

A feature of the current disclosure is that rotatable bevel gear 59 is injection molded of a plastics material such as Delrin or Acetyl in one piece around the end of rotatable drive shaft 53 which is configured at one end in a serpentine shape 62 to retain rotatable bevel gear 59. Rotatable bevel gear 60 is injection molded of a plastics material such as Delrin or Acetyl in one piece around drive tail rotor shaft 61 which has notch 58 to retain gear 60.

Figure 6A:
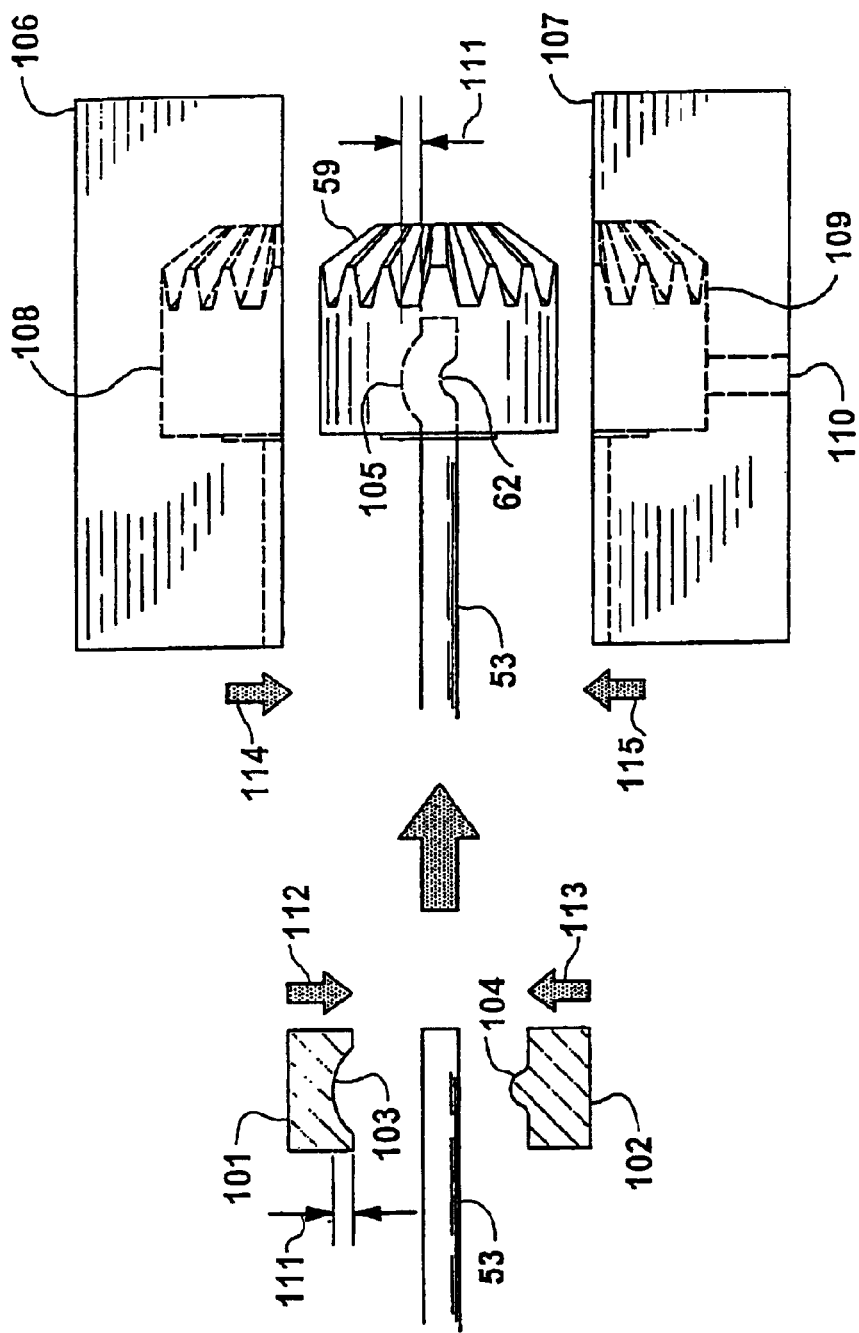
FIG. 6a is a simplified side elevation view of a mechanical pressing operation and an injection molding operation illustrating a method for manufacturing a tail rotor drive gear according to the current disclosure.

Referring to FIG. 6a which illustrates a manufacturing process for rotatable drive shaft 53 and rotatable bevel gear 59, rotatable drive shaft 53 is made of high strength steel such as ASTM-A-228 piano wire. During manufacture, rotatable drive shaft 53 undergoes a first operation to create a holding geometry 105 on rotatable drive shaft 53 which protrudes from the outer radius of rotatable drive shaft 53 by an arm distance 111 to retain rotatable bevel gear 59. During said first operation, rotatable drive shaft 53 is forcibly pressed between upper steel die 101 and lower steel die 102 as they close in die directions 112,113 to form serpentine shape 62. Upper die 101 has recess 103, and lower die 102 has boss 104 which cooperate to form the reverse image of serpentine shape 62 when pressed against rotatable drive shaft 53.

After being formed in the first operation, rotatable drive shaft 53 is transferred to a molding station where first mold half 106 and second mold half 107 have interior cavities 108,109 defining rotatable bevel gear 59. In a second operation, serpentine shape 62 of rotatable drive shaft 53 is transferred to a mold cavity 108,109 in an injection molding machine, mold halves 106,107 are closed in mold directions 114,115 and a liquid plastics material such as Acetyl is injected into the mold cavity through sprue passage 110 thereby encapsulating serpentine shape 62 and forming rotatable bevel gear 59.

After molding, rotatable bevel gear 59 and rotatable drive shaft 53 form a single integral part that will not slip or fail for the useful life of rotatable bevel gear 59. Arm distance 111 is set to accommodate the size of rotatable bevel gear 59 and the diameter of rotatable drive shaft 53 which can include very small diameters. A feature of the manufacturing method of the current disclosure is that rotatable bevel gear 59 is low weight and compact to reduce the possibility of a tail-heavy condition of helicopter 1. It will be understood by one skilled in the art of manufacturing that dies 101,102 and mold halves 106,107 are shown in FIG. 6*a* to illustrate the method of the current disclosure, and said dies and molds can vary in form while producing the same results in practice. It will be further understood that other drive train components can be appended rotatable drive shaft 53 using the method disclosed.

Figure 7:
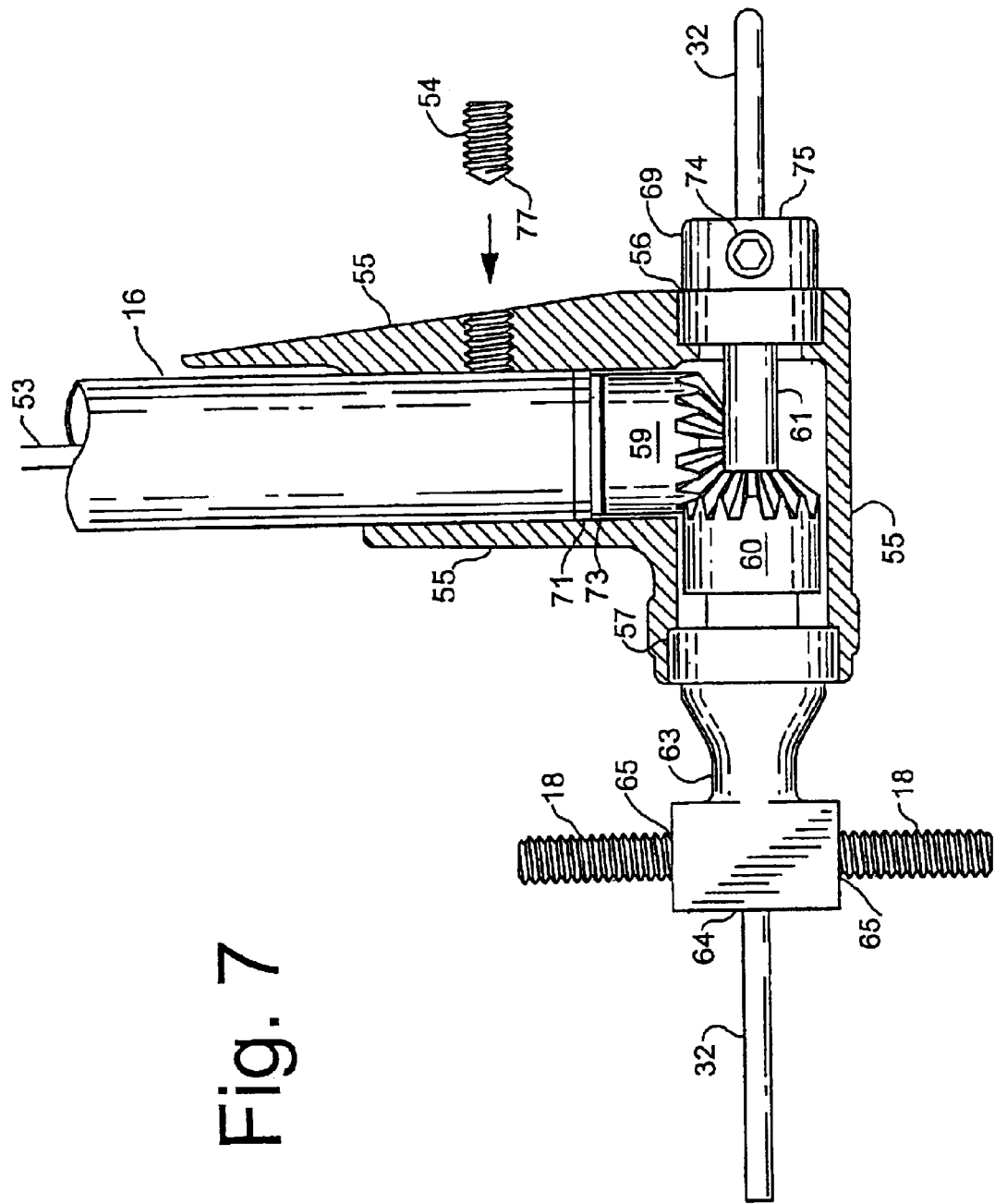
FIG. 7 is a top elevation view of the tail rotor gear box illustrated in FIG. 2 cut away to show interior detail before insertion of a tail boom holding screw, with most tail rotor components removed for clarity.
Figure 8:
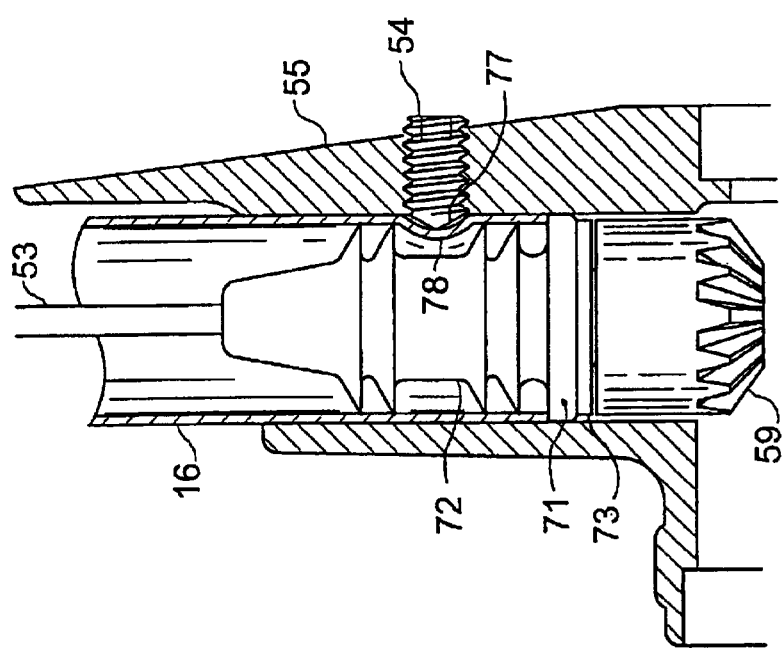
FIG. 8 is a top plan view of the tail rotor gear box illustrated in FIG. 2 cut away to show interior detail after insertion of a tail boom holding screw, with all tail rotor components removed for clarity.

As shown in FIGS. 7, 8, a gear box housing 55 is formed to include a tail boom receiver 100, and is secured to tail boom 16 by housing retainer 54 configured to move in a retainer aperture 101 into deformation 78 of the surface of tail boom 16. Tip 77 of housing retainer 54 is pointed to concentrate force on tail boom 16 to deform the surface of tail boom 16 into bushing channel 72 in bushing 71. Tip 77 acts as a key inside of deformation 78 to prevent gear box housing 55 from rotating or moving axially relative to tail boom 16. A feature of the current disclosure is that no special manufacturing operations such as slotting or drilling are required to prepare tail boom 16 for assembly to gear box housing 55.

Figure 9:
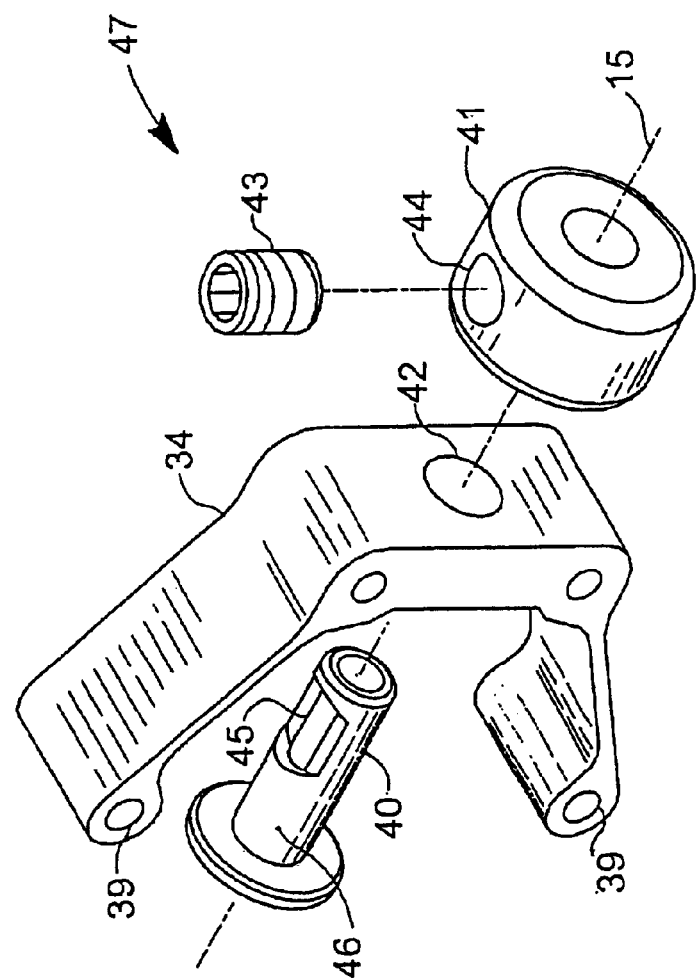
FIG. 9 is an exploded isometric perspective view of the tail rotor spider assembly illustrated in FIG. 2 with all other parts of the tail rotor removed for clarity.

Referring now to FIG. 9, spider eyelet 40 extends through eyelet hole 42 and into eyelet collar 41. Setscrew 43 extends through threaded hole 44 in collar 41 and into clearance hole 45 to secure eyelet 40 to push-pull rod 32 (see FIG. 10). When assembled, eyelet 40 and collar 41 together define an annular recess 46 in which spider 34 can rotate freely.

As shown in FIGS. 4, 5, 9 and 10, push-pull rod 32 extends through the center of spider eyelet 40 which is fixedly secured to push-pull rod 32 by collar 41 and collar setscrew 43. Pitch pins 31 extend through pitch pin holes 29 in reach-around grips 32, and are pressed into and secured within spider pitch pin holes 39 in spider 34. Operation of push-pull rod 32 in the direction of arrow 17 pitches tail rotor blade 11 to a lower angle-of-attack 37.

Figure 10:
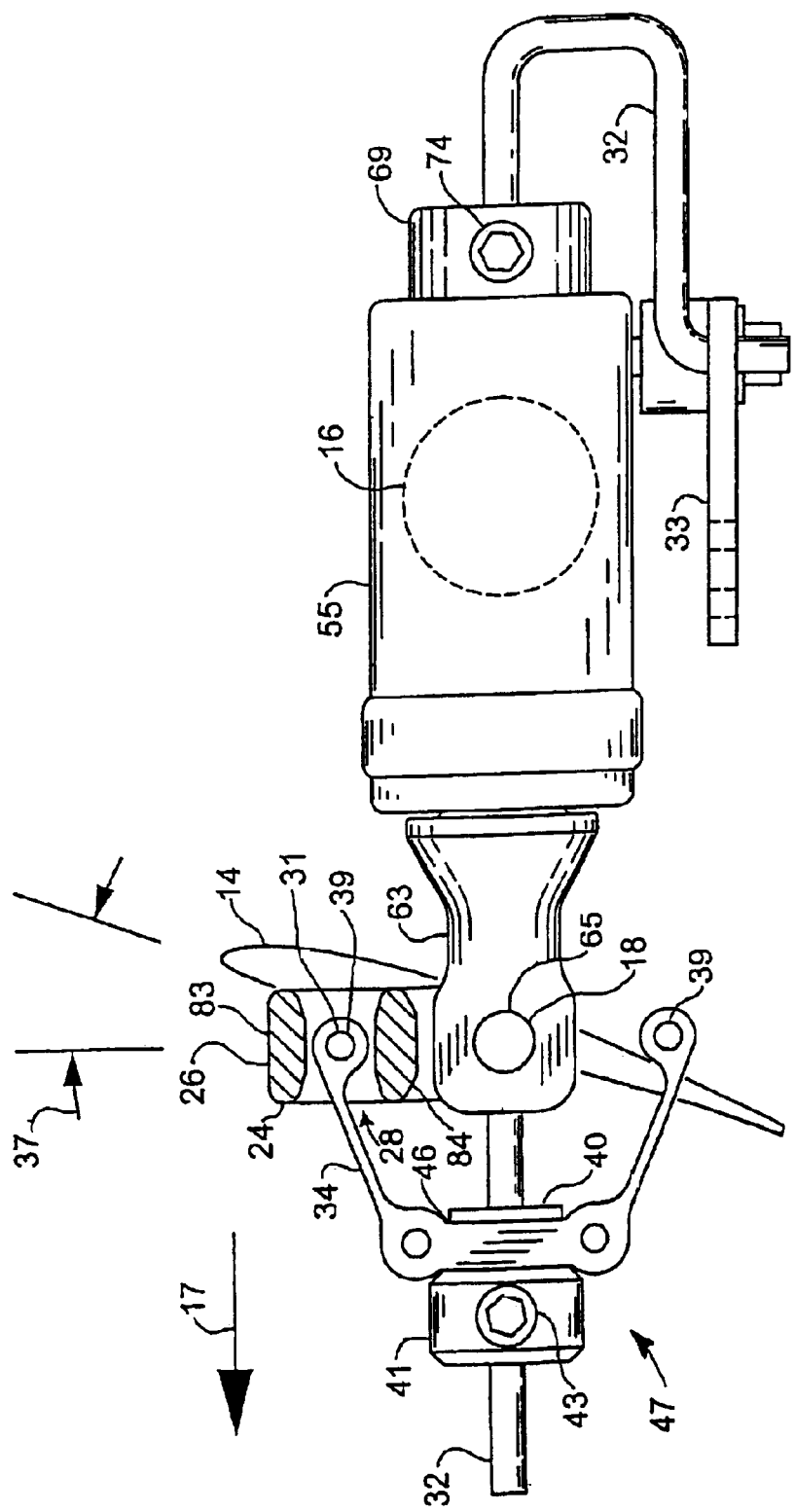
FIG. 10 is a rear end elevation view of the tail rotor assembly of the helicopter shown in FIG. 1 with one tail rotor blade grip shown in cross section at the spider attachment area, and with all parts of the helicopter forward of the gear box and the rear half of the tail rotor assembly removed for clarity.
Figure 11:
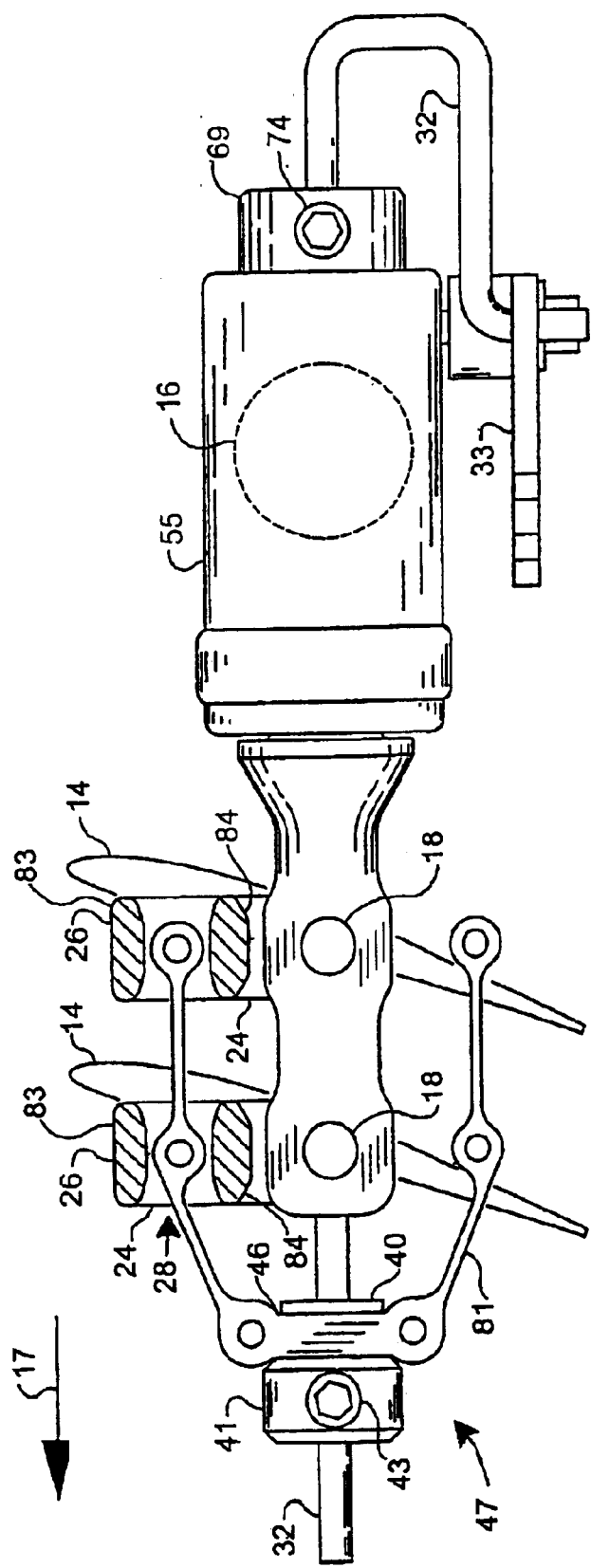
FIG. 11 is a rear end elevation view of the tail rotor assembly of a second embodiment of the current disclosure having a double tail rotor blade assembly with two tail rotor blades shown in cross section at their respective spider attachment areas, and with all parts of the helicopter forward of the gear box and the rear half of the tail rotor assembly removed for clarity.
Figure 12:
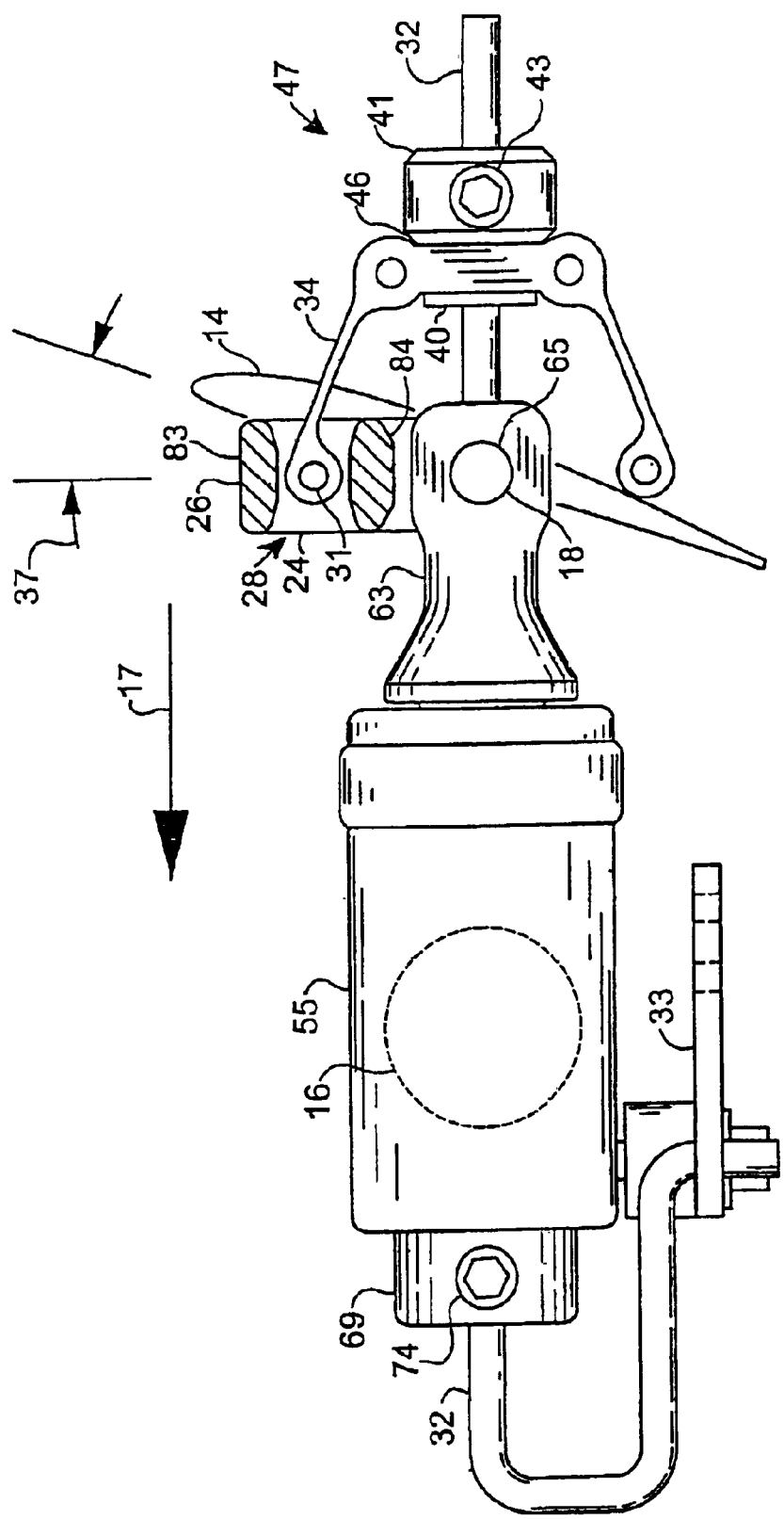
FIG. 12 is a rear end elevation view of a third embodiment of the current disclosure having a tail rotor blade in a "puller" configuration with one tail rotor blade shown in cross section at the spider attachment area, and with all parts of the helicopter forward of the gear box and the rear half of the tail rotor assembly removed for clarity.

As shown in FIGS. 10–12, a feature of the current disclosure is that pitch control linkages such as spider 34 can be operably connected to link portion 26 of blade grip 24 from either side of link opening 28 to allow tail rotor blade 14 to be mounted in either a "pusher" or "puller" configuration. When tail rotor thrust is directed away from tail boom 16 in direction 17, tail rotor 13 is called a "pusher" type tail rotor as shown in FIGS. 1, 2, 10, 12 and 13. When the tail rotor thrust force is directed toward tail boom 16 as in FIG. 12, the tail rotor is called a "puller" type tail rotor. Another feature of the current disclosure shown in FIG. 11 is that multiple tail rotor blades 14 can be linked together with the pitch control linkage 81 extending from one blade to the next in series. This allows for multi-bladed tail rotor configurations having two or more tail rotor blades connected together.

Figure 15:
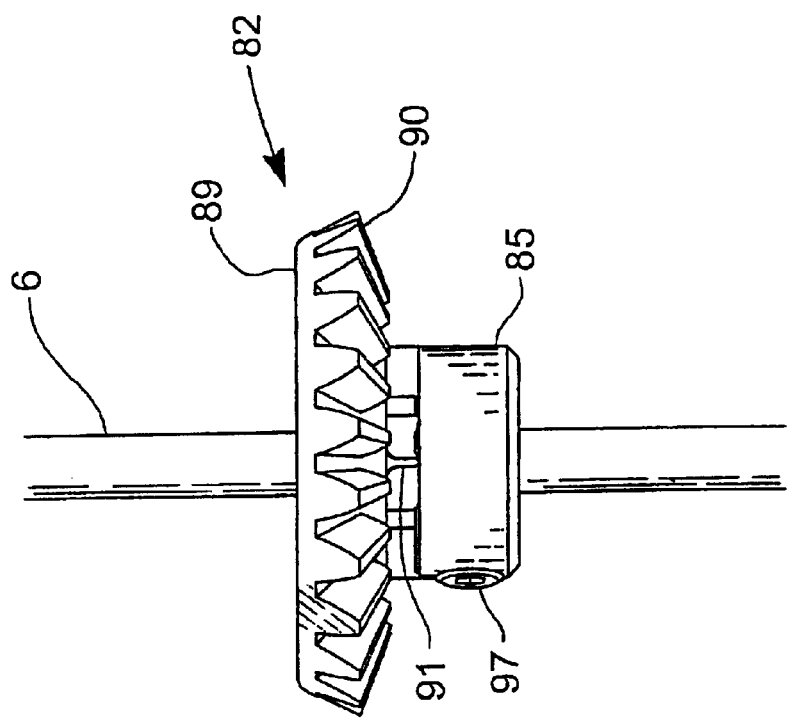
FIG. 15 is a side elevation view of a tail rotor slip-clutch in accordance with the present disclosure extracted from the tail rotor power transmission system of the helicopter shown in FIG. 1.
Figure 16:
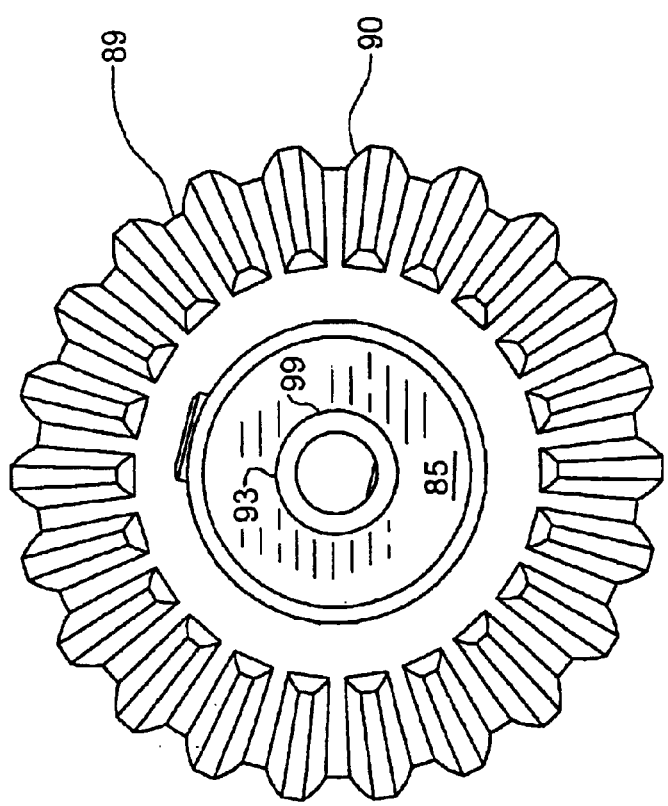
FIG. 16 is a top plan view of the slip-clutch shown in FIG. 15.
Figure 17:
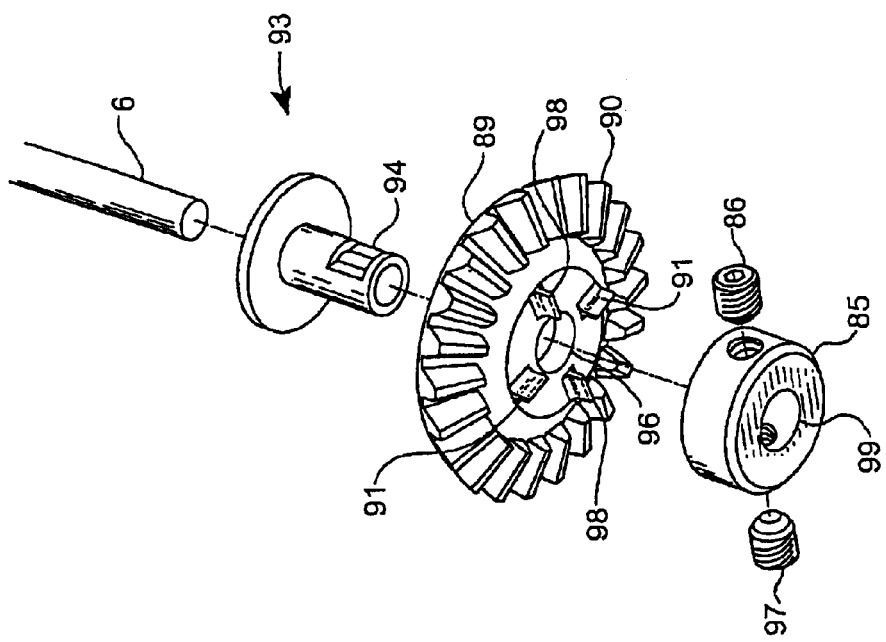
FIG. 17 is a first exploded isometric view of the slip-clutch shown in FIGS. 15 and 16 showing individual mechanical components thereof and particularly the underside of upper clutch plate according to the current disclosure.
Figure 18:
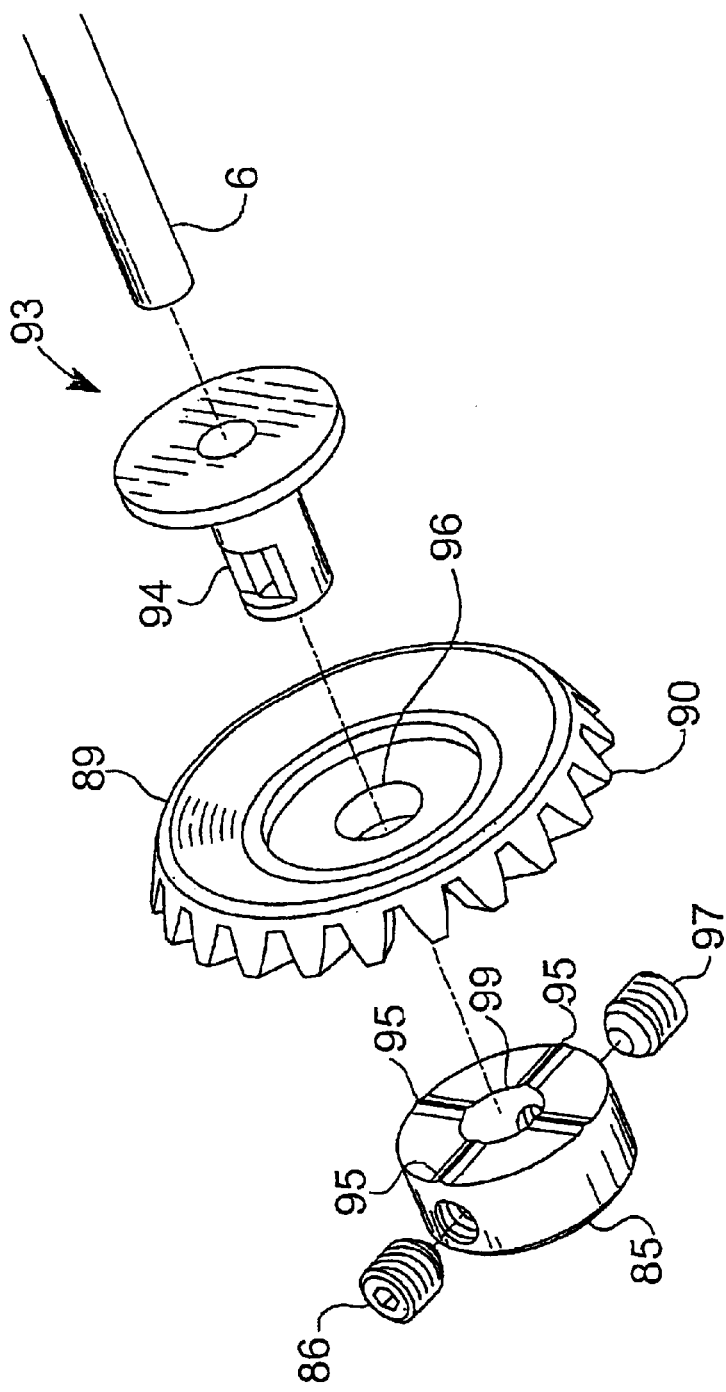
FIG. 18 is a first exploded isometric view of the slip-clutch shown in FIGS. 15 and 16 showing individual mechanical components thereof and particularly the upper side of a clutch hub according to the current disclosure.

Referring now to FIG. 15 through FIG. 17, power limiting device means includes a slip-clutch 82 in accordance with the current disclosure, an upper clutch plate 89 having gear teeth 90 and flexible tabs 91, a clutch eyelet 93 having an eyelet opening 94, and clutch hub 85 having radially extending clutch ridges 95 around its upper periphery. Clutch eyelet 93 passes through center hole 96 in upper clutch plate 89 and into clutch hub hole 99 in clutch hub 85 where it is secured by setscrew 97 in clutch hub 85. Clutch hub 85 secures slip-clutch 82 to main rotor shaft 6 by clutch setscrew 86 which passes through eyelet opening 94 in clutch eyelet 93 and presses against main rotor shaft 6 which extends through clutch eyelet 93.

Each clutch ridge 95 operates against the end portion 98 of a flexible tab 91 on upper clutch plate 89 thereby transferring rotational motion of main rotor shaft 6 to upper clutch plate 89. Clutch gear teeth 90 on upper clutch plate 89 engage the gear teeth of front pinion gear 51 which is connected to rotatable drive shaft 53 and transmits power from power plant 7 to tail rotor 13 (see FIG. 3). Application of a force beyond a pre-set limit to tail rotor 13 causes flexible tabs 91 to flex or bend.

This flexing action shortens the length of flexible tabs 91 until flexible tabs 91 slide over clutch ridges 95 allowing upper clutch plate 89 and clutch hub 85 to slip past one another thereby limiting the amount of power from the plant power available to tail rotor 13. This can limit the amount of damage done to tail rotor 13 when, for instance, tail rotor blades 14 strike the ground or another obstacle.

An alternative embodiment (not shown) of slip-clutch 82 has clutch plates that are pressed together by a spring mechanism to develop adjustable friction between the plates. Application of a force beyond a pre-set limit causes the plates to slip past one another thereby limiting the amount of power plant power available to tail rotor 13.

While a clutch system such as slip-clutch 82 may be located anywhere along the tail rotor power transmission system (for example, by tail rotor 13 or in tail rotor hub 63), slip-clutch 82 in accordance with the current disclosure is located forward of tail rotor 13 on or near main rotor shaft 6 to reduce the weight of tail rotor 13 and prevent a tail-heavy condition of helicopter 1. Regardless of the physical location of slip-clutch 82, slip-clutch 13 and tail rotor 13 cooperate to form a low weight, durable tail rotor system.

As described herein, an improved tail rotor system includes a tail rotor spaced apart from the body of the helicopter to control the flight direction of the helicopter, a tail boom assembly supporting the tail rotor and connecting the tail rotor to the body, and a tail rotor drive mechanism for transmitting motive power from a power source to the tail rotor to rotate the tail rotor about a tail rotor axis of rotation which, in one embodiment, is substantially perpendicular to the main rotor axis of rotation. While the power source is usually located inside the body of the helicopter, in one embodiment it is located at the end of a helicopter tail boom near the tail rotor, or on the end of a wing on a tilt-rotor aircraft. The tail rotor comprises one-piece molded rotor blades that can be configured to operate in either a "pusher" or "puller" configuration without structural modification, and a simplified one-piece tail rotor hub that is easy to manufacture and resistant to damage from crashes. The tail boom assembly includes a simplified and improved gear box design that provides a positive attachment to the tail boom through mechanical deformation of the tail boom tube. The tail rotor drive means includes a torque-limiting device such as a slip-clutch to reduce tail rotor and drive train damage in the event of a tail blade strike on the ground or other obstruction.

A tail rotor system in accordance with this disclosure includes tail rotor elements with low cost reversible rotor blades, mechanical drive elements including, for instance, a slip-clutch that resist damage due to crashes, and simplified supporting structure that is inexpensive to manufacture. While the current disclosure has significant applications in model helicopters, many aspects of the current disclosure can also be used in full-size man-carrying helicopters and similar aircraft such as, for instance, tilt-rotor aircraft. When used on helicopters, a tail rotor system increases tail rotor effectiveness and durability, and reduces manufacturing and operating costs.

What is claimed is:

1. An aircraft rotor system comprising a tail boom made of a deformable material and formed to include an interior region containing a rotatable drive shaft, a gear box associated with the tail boom, the gear box including a housing formed to include a tail boom receiver and a retainer aperture opening into the tail boom receiver, a rotatable bevel gear mounted for rotation in an interior region of the housing and in spaced-apart relation to the tail boom and adapted to rotate tail rotor blades associated with the rotatable bevel gear, and a bushing arranged to support the drive shaft for rotation inside the tail boom receiver, a portion of the tail boom being located to lie between the bushing and the tail boom to confront the opening of the retainer aperture, and a housing retainer configured to move in the retainer aperture in a direction toward the bushing located in the tail boom receiver, the housing retainer including a force receiver adapted to mate with a force-producer tool and means for engaging an exterior surface of the tail boom and deforming the tail boom to move a deformed portion of the tail boom toward the bushing into a bushing channel formed in the bushing in response to movement of the housing retainer in the retainer aperture toward the bushing so that the housing is retained in a fixed position on the tail boom without hindering rotation of the drive shaft, and bevel gear within the housing.

2. A rotor system for an aircraft having a fuselage, a rotor for moving air, the rotor system comprising a housing for supporting the rotor for rotation about a rotor rotation axis and a tail boom for supporting the housing in spaced-apart relation to the body, and retainer means for securing the housing to the tail boom, the retainer means comprising at least one retaining screw engaging a wall of the housing in perpendicular relation to the tail boom and one end of the retaining screw presses against the surface of the tail boom to secure the housing to the tail boom and the retaining screw deforms the surface of the tail boom inward into a bushing channel in an interior portion of the tail boom to produce a retainer indentation in the tail boom.

3. In a rotor system for an aircraft having a body, a rotor for moving air, a housing for supporting the rotor for rotation about a rotor rotation axis, and a tail boom for supporting the housing in spaced-apart relation to the body, a method for fixedly coupling the housing to the tail boom comprising the steps of moving a retaining mechanism to engage a wall of the housing abutting the tail boom, to cause the tail boom to deform the surface of the tail boom into a bushing channel and create a recess in the tail boom receiving the retaining mechanism therein to secure the housing to the tail boom against axial and rotational motion of the housing relative to the tail boom.

4. A rotor system for an aircraft having a rotor for moving air, the rotor system comprising a rotor hub connected to a rotor shaft and supported for rotation about a rotor axis of rotation, the rotor hub having a first side and a second side located in spaced-apart relation to the rotor axis of rotation and diametrically opposed to each other, a first rotor blade grip extending in perpendicular relation to the rotor axis of rotation and having a finger part abutting a first side of the rotor hub, a root part in proximity to a second side of the rotor hub, and the root part and finger part of the first rotor blade grip each contain a coaxial passage receptive to a pitch axle, a second rotor blade grip extending in perpendicular relation to the rotor axis of rotation and having a finger part abutting the second side of the rotor hub, a root part in proximity to the first side of the rotor hub, and the root part and finger part of the second rotor blade grip each contain a coaxial passage receptive to a pitch axle, a pitch axle extending through the root part of the first rotor blade and the finger part of the second rotor blade and into a side of the rotor hub and the first and second rotor blade grips are rotatable on the pitch axle for rotation about a rotor blade pitch axis, the pitch axle being fixedly coupled to the rotor hub and free of rotation about its longitudinal axis.

5. A rotor system for an aircraft, the rotor system comprising a rotor for moving air, a power plant for driving the rotor about a rotor axis of rotation, and a power transmission system for transmitting power from the power plant to the rotor, the power transmission system including power-limiting device means for disconnecting the power plant from the rotor in response to application of a force to the rotor above a desired value as by impact of the rotor against an obstacle or the ground to cause the power plant to disconnect from the rotor so that power available from the power plant to the rotor is reduced.

6. The rotor system of claim 5, wherein the power-limiting device means includes a clutch, and application of a torque force to the rotor above a desired value as by impact of the rotor with the ground causes the clutch to slip relative to the power plant thereby limiting the torque available to drive the rotor.

7. The rotor system of claim 4, wherein the pitch axle abuts the rotor shaft and fixedly secures the rotor hub to the rotor shaft.

8. The rotor system of claim 7, wherein the pitch axle is a setscrew having a threaded exterior and the rotor hub has at least one threaded cross hole in one of the first side and second side and the pitch axle screws into the threaded cross hole and against the rotor shaft.

9. The rotor system of claim 5, wherein the power-limiting device means includes a clutch coupled to the rotors and configured to slip relative to the power plant in response to application of a torque force to an affected rotor above a desired value as by impact of the rotor with the ground thereby limiting the torque available to drive the affected rotor without limiting the torque available to drive the remaining rotors.

10. A rotor system for an aircraft, the rotor system comprising a rotor for moving air, a power plant for driving the rotor about a rotor axis of rotation, and the power transmission system including power-limiting device means for disconnecting the power plant from at least one affected rotor in response to application of a force to the affected rotor above a desired value as by impact of the affected rotor against an obstacle or the ground to cause the power plant to disconnect from the affected rotor so that power available from the power plant to the affected rotor is reduced while the power available to the remaining rotors is not substantially reduced.

11. The rotor system of claim 9 wherein the aircraft is a helicopter having a main rotor supported for rotation about a main rotor axis by a main rotor shaft, a tail rotor supported for rotation about a tail rotor axis by a tail rotor shaft, a tail rotor drive shaft operably connecting the main rotor shaft and tail rotor shaft to transmit motive power from the main rotor shaft to the tail rotor shaft, and the power-limiting device means is a slip-clutch located between the main rotor shaft and the tail rotor drive shaft and configured to disconnect the tail rotor drive shaft from the main rotor shaft upon application of a force to the tail rotor above a desired value as by impact of the tail rotor with the ground.

12. An aircraft rotor system comprising a main rotor supported for rotation about a main rotor axis and driven by a power plant to lift the helicopter into the air, a tail rotor supported for rotation about a tail rotor axis substantially perpendicular to and in spaced apart relation to the main rotor axis and driven by a power plant to counter the torque produce by the main rotor, a tail rotor power transmission system for transmitting power from the power plant to the tail rotor, and power-limiting device means for disconnecting the tail rotor from the power plant in response to application of a force to the tail rotor above a desired value as by impact of the tail rotor against an obstacle or the ground to cause the tail rotor to disconnect from the power plant to reduce damage to the tail rotor and tail rotor power transmission system.

* * * * *